May 19, 1931.  H. HEYMANN  1,806,349
ELECTRIC ROLLING MILL DRIVE WITH LEONARD CONTROL
Filed Oct. 5, 1926
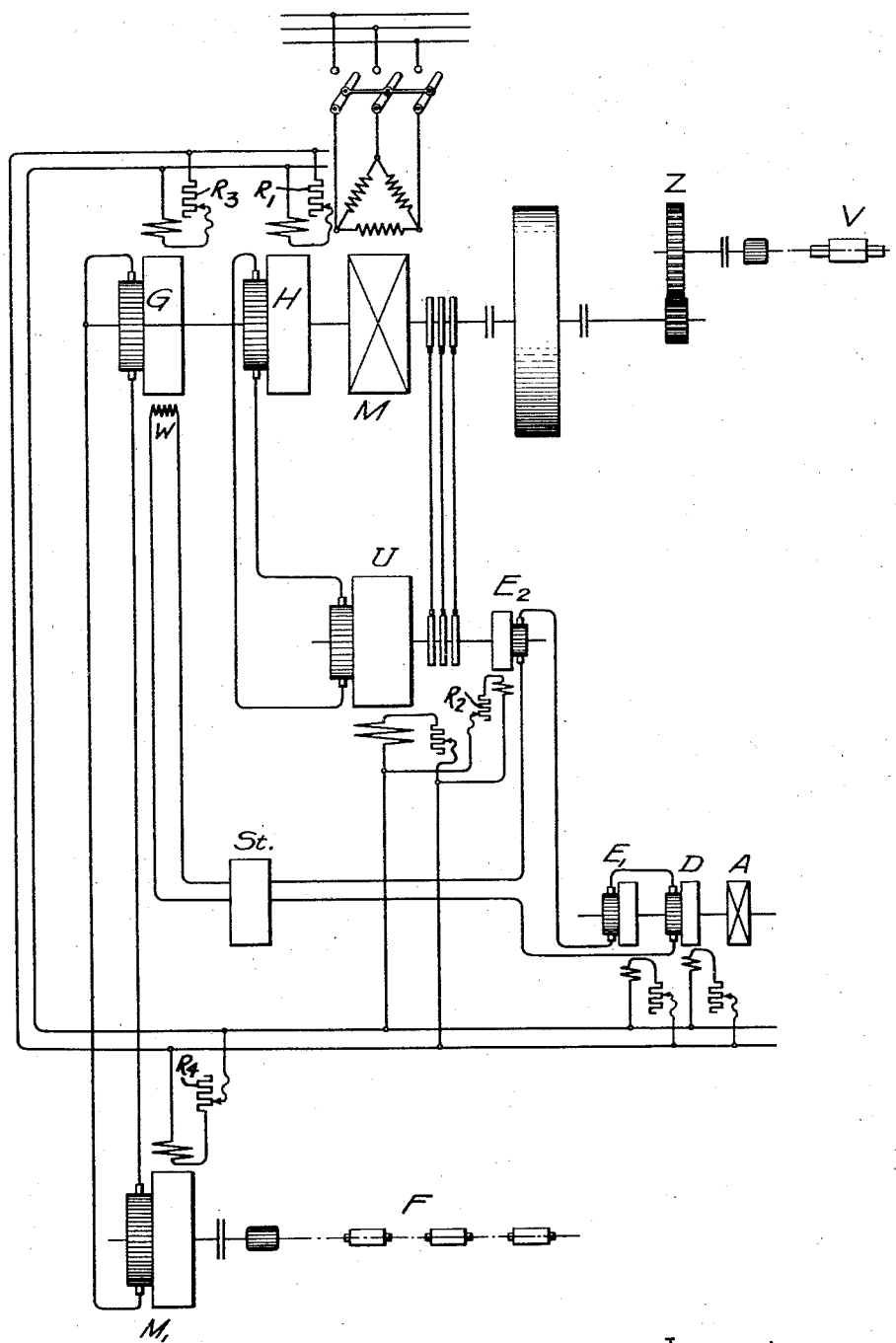
Inventor:
Hugo Heymann,
by Alexander F. [illegible]
His Attorney.

Patented May 19, 1931

1,806,349

UNITED STATES PATENT OFFICE

HUGO HEYMANN, OF FRIEDENAU, BERLIN, GERMANY, ASSIGNOR TO GENERAL ELECTRIC COMPANY, A CORPORATION OF NEW YORK

ELECTRIC ROLLING MILL DRIVE WITH LEONARD CONTROL

Application filed October 5, 1926, Serial No. 139,729, and in Germany November 17, 1925.

In a copending application of Ernst Riecke, Serial No. 110,558, filed May 20, 1926, an electric rolling mill drive with Leonard control is described, in which the alternating current driving motor for one stand or set of rolls drives a generator which supplies power to a motor which drives another set of rolls. Such an arrangement does not, however, suffice for all purposes. In the rolling operation the material first passes the rolls driven with constant speed, which in the case of medium iron, will be the cogging rolls. If now, the rolling mill is provided for a comprehensive rolling programme, the weight and cross-section of the ingots taken to the cogging rolls change. In this case it is advantageous to be able to suit, not only the speed of the finishing rolls, but also that of the cogging rolls, to the rolling programme in hand.

According to the invention this is effected by making the driving motor for the cogging rolls capable of regulation, for example, by means of a Krämer cascade arrangement. The speed of the alternating current driving motor and thus also the speed of the cogging mill can now be adjusted in accordance with the rolling programme. Consequently the basic speed of the driving motor of the finishing mill driven with Leonard control automatically assumes a corresponding value. The further regulation of this mill from the basic speed upwards or downwards, according to the requirements of the rolling operation, is not affected by this.

If a Leonard control arrangement with fly wheel equalization (Ilgner converter) is used and driven by a cascade set, the arrangement according to the invention brings in addition the further advantage that the load factor of the alternating current motor can be adjusted to unity and the slip energy can be regained. On the slipping of the alternating current motor in relation to the adjusted basic speed, both the speed of the directly driven cogging mill and the basic speed of the finishing mill driven with Leonard control will fall. In the case of the cogging rolls this diminution of the speed is not of great importance, since with the short cogging the fraction of cogging time to the total rolling time is relatively small. With the finishing rolls on the other hand the falling of the basic speed of the rolling motor with increasing slip of the Ilgner converter would result in a noticeable falling off in production. According to the further invention, therefore, an arrangement is provided which equalizes the influence of the converter slip on the basic speed of the finishing rolls. This can, for example, be achieved by connecting in series with the exciting machine of the Leohard system generator two further exciting machines, of which one is driven with constant speed, while the second is coupled with the intermediate converter of the three-phase cascade set of the Ilgner converter. So long as the Ilgner converter runs with any basic speed adjusted as desired, these two auxiliary machines are so balanced that their voltages cancel out. On the field of the Leonard dynamo there works then merely the voltage of the actual exciting machine. With the setting in of the slip of the Ilgner converter, the voltage of the machine coupled with the single armature rotary converter preponderates over that of the machine driven with constant speed, since the speed of the single armature converter increases in proportion with the slip and strengthens the field of the Leonard system generator by this additional voltage.

In the accompanying drawing a constructional example is represented. The Ilgner converter is driven by a Krämer cascade arrangement, which consists of the alternating current slip ring motor M, the direct current machine H and the single armature rotary converter U. The current of the exciting machine D is led to the field W of the Leonard system generator G through the control switch St. The exciting machine D is arranged in series with the machines $E_1$ and $E_2$, which in the manner described maintain constant the voltage of the dynamo G independently of the slip of the Ilgner converter. The machines D and $E_1$ are driven by a motor A of any suitable type. The converter drives the cogging rolls V through the intermediate toothed gear Z, while the finishing mill F is driven by the motor $M_1$, which the dynamo G feeds in Leonard circuit arrangement.

In operation, the basic speed of the drive as a whole may be adjusted over a wide range of values. For example, let it be assumed that the speed of the motor "M" of the cascade regulator set is such as to drive the rolls "V" at the roughing stand at 400 R. P. M. and let it further be assumed that the excitation of the generator "G" and the speed at which the generator is driven by the motor "M" are such as to cause the finishing mill motor "$M_1$" to rotate at 500 R. P. M. If now it should be desired to increase the speed of the drive as a whole, i. e., increase the speed of both motors, this may be accomplished by varying the resistance "$R_1$" to increase the speed of the motor "M" of the cascade regulator set.

As previously pointed out when the speed of the motor "M" varies the exciters "$E_1$" and "$E_2$" function to vary the excitation of the generator "G" and consequently the speed of the finishing motor "$M_1$" to maintain the original speed of the finishing motor "$M_1$".

In order that the exciters "$E_1$" and "$E_2$" shall not function to weaken the field "W" of the generator "G" to maintain the previous speed of the finishing stand motor "$M_1$" when it is desired to adjust the basic speed of the drive, the regulating resistance "$R_2$" must be simultaneously adjusted so that the voltages of the exciters "$E_1$" and "$E_2$" will again equalize and balance each other out at the new speed at which the exciter "$E_2$" is driven. As a result of maintaining the balance between the voltages of the exciters "$E_1$" and "$E_2$" the excitation of the field "W" of the generator "G" remains constant. The voltage of generator "G" does not remain constant, however, but increases proportionately to the increase in speed at which it is driven by the motor "M". As a result of the increase in voltage of the generator "G", the basic speed of the motor "$M_1$" will be adjusted to the new value.

Persons skilled in the art will understand that the resistances "$R_1$" and "$R_2$" may be so arranged and the means by which they are adjusted may be so coupled that adjustment of both takes place simultaneously in response to a single movement by the operator.

Should it be desired to vary the speed of either the roughing mill stand or the finishing mill stand independently of the other, this may be accomplished in several ways, i. e., the resistance "$R_1$" may be varied independently of the resistance "$R_2$" to increase or decrease the speed of the motor "M" and consequently the roughing mill stand "V". The exciters "$E_1$" and "$E_2$" will then function in the manner previously described to vary the excitation of the generator "G" to maintain constant speed of the finishing mill motor "$M_1$". In the event that the resistance "$R_2$" is varied simultaneously with the resistance "$R_1$", the speed of the finishing mill motor "$M_1$" will also tend to assume a new basic value but may be maintained at its original speed by varying the resistance "$R_3$" in the separately excited field circuit of the generator "G" from which the finishing mill motor "$M_1$" is supplied.

Persons skilled in the art will also understand that the speed of the finishing mill motor "$M_1$" may be adjusted independently of the roughing mill motor as desired either by variation of the resistance "$R_3$" or by variation of the resistance "$R_4$" in the circuit of the separately excited field winding of the motor "$M_1$".

Thus, it will be seen in the operation of this system that the basic speeds of the roughing mill and finishing mill motors "M" and "$M_1$" may be adjusted independently of or in unison with each other over a wide range of values to any desired speed setting and that the exciters "$E_1$" and "$E_2$" will maintain the speed of the finishing mill motor "$M_1$" constant during the variations in slip of the motor "M" of the regulator set at all speed settings of the drive.

What I claim as new and desire to secure by Letters Patent of the United States, is:

In combination in an adjustable speed electric drive for a rolling mill and the like having a plurality of stands, an alternating current motor for driving one of said stands, a Leonard drive for another of said stands comprising a separately excited generator driven by said motor and a separately excited motor connected to said other stand and supplied with armature current from said generator, a Krämer cascade regulating control for said alternating current motor, said control comprising a separately excited converter motor mechanically - connected with said alternating current motor and an intermediate converter electrically interconnecting the secondary of said alternating current motor and said converter motor, means for varying the excitation of said converter motor and said generator to adjust the basic speeds of both said stand drive motors, and means for automatically regulating the excitation of said generator to compensate for variations in the slip of said alternating current motor comprising a separately excited exciter driven by said intermediate converter and two independently driven separately excited exciters, the armatures of said exciters being connected in series relation, means for adjusting the excitation of said exciters for different basic speeds of the drive whereby the voltage of said exciter driven by said intermediate converter neutralizes the voltage of one of said separately driven exciters while the slip of said alternating current motor is a predetermined value.

In witness whereof, I have hereunto set my hand this 17th day of September 1926.

HUGO HEYMANN.